W. A. BAILEY.
EGG TESTER.
APPLICATION FILED AUG. 3, 1914.

1,174,303.

Patented Mar. 7, 1916.
4 SHEETS—SHEET 1.

Witnesses
Wynne Johnson

Inventor
W. A. Bailey
By
C. L. Parker
Attorneys

W. A. BAILEY.
EGG TESTER.
APPLICATION FILED AUG. 3, 1914.

1,174,303.

Patented Mar. 7, 1916.
4 SHEETS—SHEET 3.

Witnesses
Wynne Johnson

Inventor
W. A. Bailey
By C. L. Parker
Attorneys

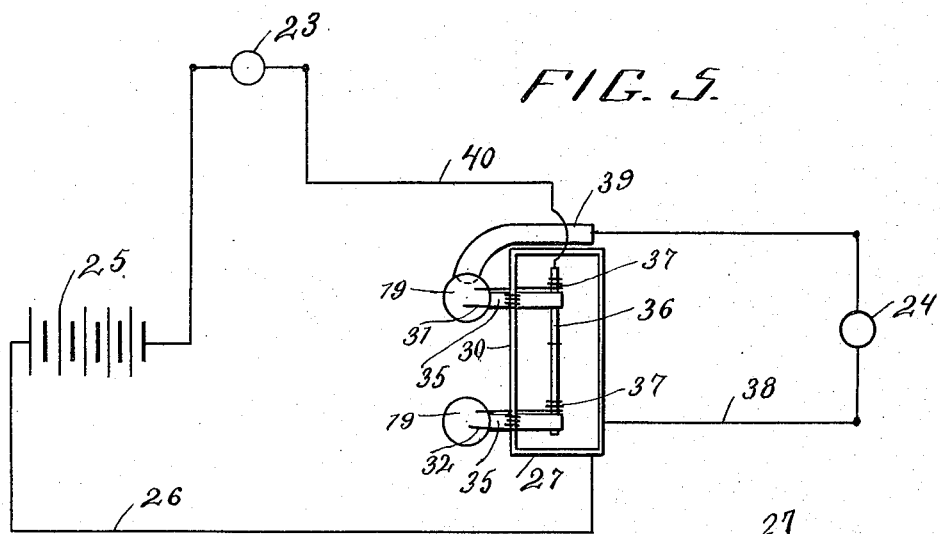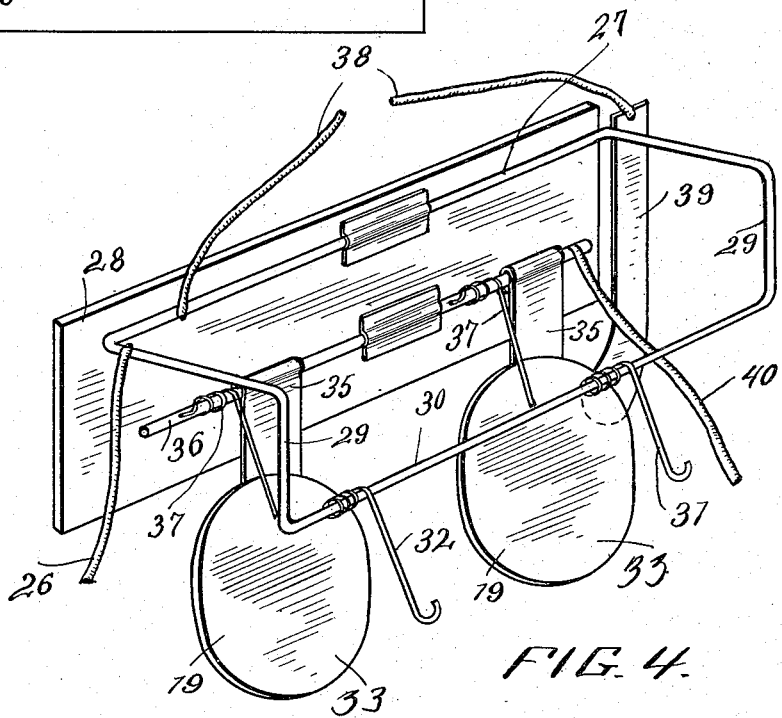

UNITED STATES PATENT OFFICE.

WILLIAM A. BAILEY, OF AURORA, MISSOURI, ASSIGNOR, BY DIRECT AND MESNE ASSIGNMENTS, OF TWO-THIRDS TO CHARLES C. McCORMICK AND ONE-THIRD TO STERLING P. WILLIAMS, BOTH OF AURORA, MISSOURI.

EGG-TESTER.

1,174,303. Specification of Letters Patent. Patented Mar. 7, 1916.

Application filed August 3, 1914. Serial No. 854,792.

*To all whom it may concern:*

Be it known that I, WILLIAM A. BAILEY, a citizen of the United States, residing at Aurora, in the county of Lawrence and State of Missouri, have invented certain new and useful Improvements in Egg-Testers, of which the following is a specification.

My invention relates to improvements in egg testers, embodying electrically operated source or sources of light.

An important object of the invention is to provide an egg tester, having interior and exterior sources of light, with means for extinguishing one source of light while the other is active, whereby they do not conflict with each other, and at the same time rendering the handling of the tester convenient in a dark room.

A further object of the invention is to provide an egg tester so constructed that all shadows between the egg and source of light are eliminated and the rays of light reflected upon the egg in a highly effective manner.

A further object of the invention is to provide an egg tester of the above mentioned character, having novel and simple means for automatically closing the testing lamp circuit, upon the insertion of the egg or eggs within the openings therefor.

A further object of the invention is to provide an egg tester of the above mentioned character having its operating parts arranged to be readily accessible for the purpose of repair or the like.

A further object of the invention is to provide an egg tester of the above mentioned character which is simple in construction, inexpensive to manufacture, neat in appearance, and durable.

Other objects and advantages of the invention will be apparent during the course of the following description.

Figure 1:
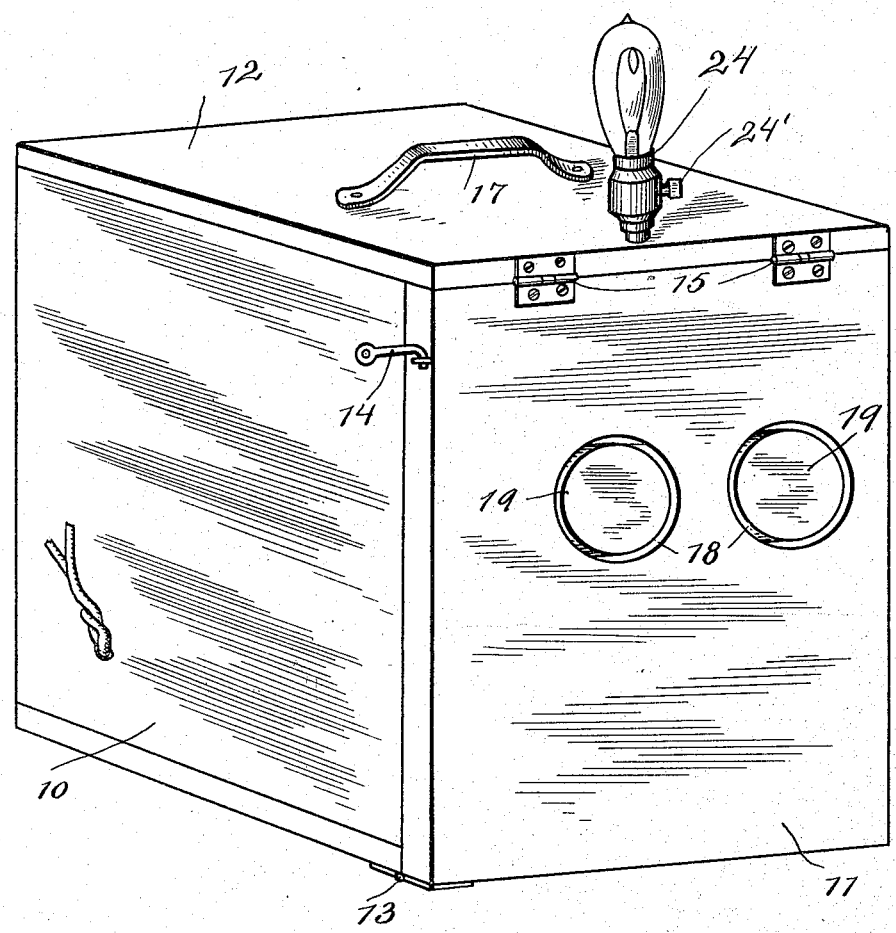
Figure 2:
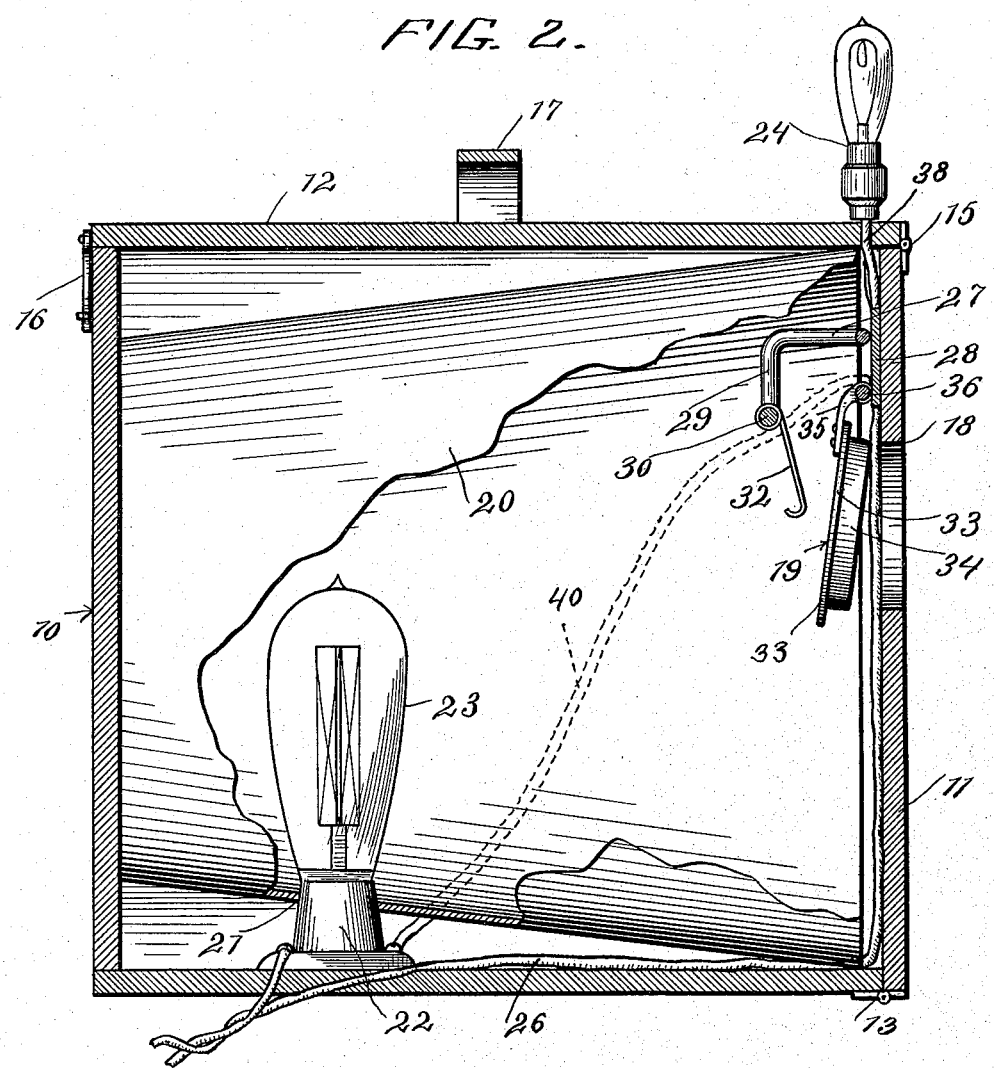
Figure 3:
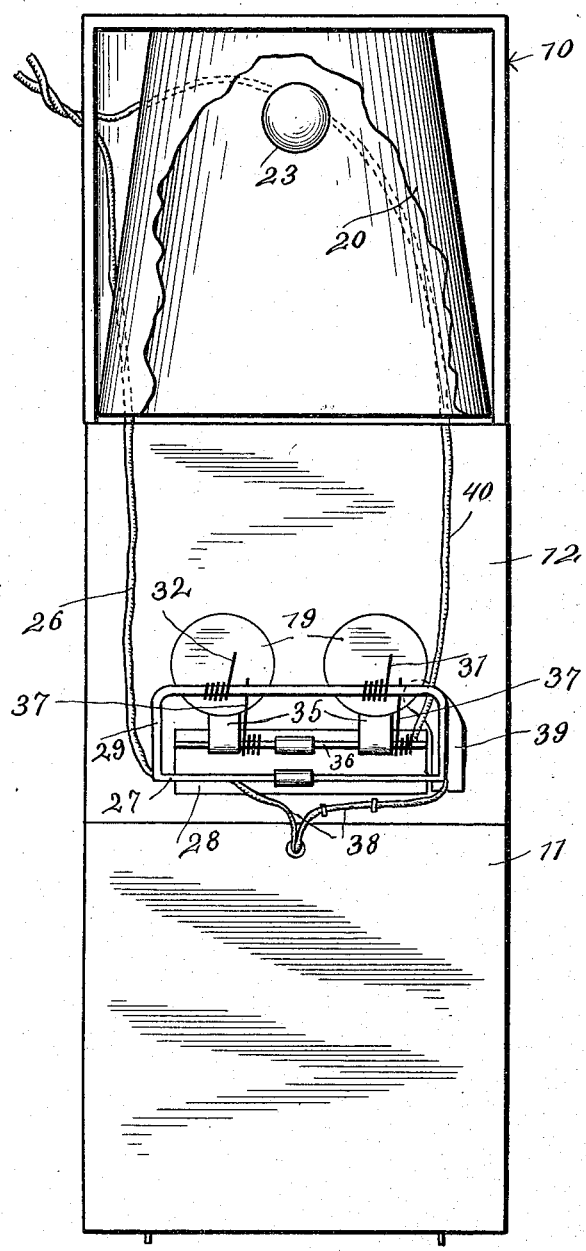

In the accompanying drawings forming a part of this specification and in which like numerals are employed to designate like parts throughout the same, Figure 1 is a perspective view of an egg tester embodying my invention, Fig. 2 is a longitudinal sectional view through the same, parts being in elevation and parts broken away, for the sake of illustration, Fig. 3 is a plan view of the apparatus with the top open, Fig. 4 is a perspective view of a switch mechanism, and, Fig. 5 is a diagrammatic view of the circuit.

In the drawings, wherein for the purpose of illustration is shown a preferred embodiment of my invention, the numeral 10 designates a preferably rectangular shell or casing, which may be preferably formed of wood, as shown, while the same may be formed of other suitable material such as sheet metal or the like. The forward end and top of the casing 10 are formed open, and are normally covered by vertical and horizontal doors 11 and 12. The vertical door 11 is hinged at its lower end, as shown at 13, with the floor or bottom of the casing 10, whereby the same is adapted to be swung in a vertical plane with relation to such casing. The vertical door 11 may be retained or locked in a vertical closed position by a detachable latch 14 or the like. The horizontal door 12, is hinged at its forward end, as shown at 15, to the upper end of the vertical door 11, and is adapted to swing in a vertical plane with relation thereto. The rear end of the horizontal door 12 is secured or locked to the corresponding end of the casing 10 by a latch 16 or the like, as more clearly shown in Fig. 2. For convenience a handle 17 is preferably attached to the upper surface of the horizontal door 12, so that the apparatus is rendered more portable. The vertical door 11 is provided with egg receiving opening or openings 18, preferably two in number, which are normally covered by swinging circuit closing doors 19, to be more fully described.

Arranged within the casing 10 is a horizontal tapered reflector shell 20, formed of tin or other suitable sheet metal, having its inner surface highly polished. The reflector shell 20 is provided in its lower portion with an opening 21, receiving a socket member 22, of an electric lamp or bulb 23. The socket member 22, as is customary, is formed of porcelain or other insulating material, is vertically arranged, and rigidly secured to the floor or bottom of the casing 10. The bulb or lamp 23 is vertically arranged within the rear portion of the reflector casing 20, as shown. The lamp 23 will, in some instances, be referred to in the claims as an interior lamp or source of light.

The numeral 24 designates an exterior electric lamp, bulb, or source of light, which is rigidly attached to the forward end of the horizontal door 12, adjacent the hinges 15, as shown. This exterior lamp is of greater resistance than the interior lamp 23 and is connected in series therewith, as will be more fully explained, whereby when the circuit is closed with both lamps connected therein, the lamp 24 will glow, but the lamp 23 will not perceptibly glow. The construction is such, as will be more fully explained, whereby when the circuit closing doors 19 are both closed, the exterior lamp 24 will glow, rendering it convenient to locate the tester in a dark room, and to manipulate the eggs or the like, and upon inserting an egg or eggs within the egg receiving opening or openings, whereby the circuit closing door or doors 19 are swung inwardly, the exterior lamp is cut out of circuit or extinguished, while the interior lamp 23 is approximately simultaneously made to glow, by the cutting out of circuit of the higher resistance of the exterior lamp, and the closing of the interior lamp circuit.

As more clearly shown in Figs. 4 and 5, the numeral 25 designates a source of current, having its positive pole connected with a wire 26, which is connected with a preferably rectangular bus bar 27, secured upon an insulating or fiber plate 28, rigidly attached to the inner surface of the vertical door 11 adjacent the upper end thereof. The ends 29 of this bus bar are L-shaped, as more clearly illustrated in Fig. 2, whereby the longitudinal portion 30 of the bus bar (see Fig. 2) is spaced a substantial distance from the inner surface of the vertical door 11. Attached to the longitudinal portion 30 of the bus bar are spring contacts 31 and 32, adapted to engage with the circuit closing doors 19, when the latter are swung inwardly. Each of these circuit closing doors embodies a metallic head 33, upon the outer surface of which is secured an insulating pad or cover 34, of the proper size to enter the opening 18, the same being preferably formed of asbestos or other fibrous material. A metallic strip 35 is rigidly secured to each metallic head 33, and has an electrical hinged or pivot connection with a co-acting stationary bus bar 36, secured to the insulating strip 28, as shown. Each of the circuit closing doors 19 is retained closed and returned to the closed position when moved therefrom by a spring 37, as shown. Connected with the bus bar 27 is a wire 38, having the exterior lamp 24 connected in series therewith. The end of the wire 38 is connected with a stationary contact 39 secured to the inner side of the vertical door 11, and having no direct electrical connection with the bus bars. The stationary contact 39 is arranged adjacent and in the path of travel of one of the circuit closing doors 19, and normally has electrical engagement or connection therewith. Connected with the bus bar 36 is a wire 40, having the interior lamp 23 connected in series therewith, the wire 40 being connected with the opposite pole of the source of current 25, as shown.

The operation of the apparatus is as follows:—With the parts arranged in their operative positions, as shown in Figs. 1 and 2, a circuit is closed for causing the exterior lamp 24 to glow, while the interior lamp 23 does not perceptibly glow, it being understood that both the circuit closing doors 19 are in the closed position, whereby they have no electrical engagement with the contact springs 32. In this closed circuit current flows from the positive pole of the source of current 25, through wire 26, a portion of bus bars 27, wire 38, exterior lamp 24, a portion of wire 38, stationary contact 39, the adjacent door 19, bus bar 36, wire 40, interior lamp 23, and back to the opposite pole of the source of current. As the lamp 24 has a higher resistance than the lamp 23 and both of these lamps are connected in series, the current is cut down by the lamp 24, whereby sufficient current does not pass to the lamp 23 to cause the same to perceptibly glow.

When an egg is inserted in the receiving opening at the left, the corresponding closing circuit door 19 is swung inwardly to electrically engage the contact spring 32, (see Fig. 5) whereby the exterior lamp 24 will be cut out of circuit, and a short circuit be completed, including the lamp 23, which is now made to glow. In this short circuit current flows from the positive pole of the source of current, through wire 26, a portion of the bus bar 27, spring contact 32, the adjacent contact closing door 19, bus bar 36, wire 40, and through interior lamp 23 back to the opposite pole of the source of current.

When an egg is inserted in the egg receiving opening 18 to the right, the exterior lamp 24 is cut out of circuit and a short circuit completed, including the interior lamp 23. When the adjacent circuit closing door 19 is swung inwardly the same breaks electrical engagement with the stationary contact 39, and makes electrical engagement with the adjacent spring contact 31. Current in the short circuit for causing the interior lamp 23 to glow, flows from the positive pole of the source of current 25, through wire 26, a portion of the bus bar 27, spring contact 31, the adjacent circuit closing door 19, bus bar 36, wire 40, and through the interior lamp 23 back to the source of current.

It is obvious if both circuit closing doors 19 are simultaneously swung inwardly, the exterior lamp 24 will be cut out of circuit, and the short circuit completed to cause the interior lamp to glow.

While it is preferred to use the apparatus in a dark room, yet I have found that some degree of success is obtainable by using the same without the dark room, in which event it is unnecessary to employ the exterior lamp 24, the same being extinguished by manipulation of the ordinary switch 24'.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. In an egg tester of the character described, a casing having an egg receiving opening, an interior electric lamp arranged within the casing, an exterior lamp arranged outwardly of the casing, and means to alternately extinguish the interior and exterior lamps.

2. In an egg tester of the character described, a casing having an egg receiving opening, an interior electric lamp arranged within the casing, an exterior electric lamp arranged outwardly of the casing, and a circuit closing door arranged to cover the egg receiving opening and adapted when in the closed position to cause the exterior lamp to glow and the interior lamp to be extinguished and when opened to extinguish the exterior lamp and cause the interior lamp to glow.

3. In an egg tester of the character described, a casing having an egg receiving opening, an electric lamp arranged within the casing, a second electric lamp arranged near and exteriorly of the casing, a circuit having the interior and exterior lamps connected therein in series whereby when the exterior lamp glows the interior lamp is extinguished, and means for automatically cutting the exterior lamp out of circuit upon inserting an egg into the egg receiving opening.

4. In an egg tester of the character described, a casing having an egg receiving opening, an electric lamp arranged within the casing, a second electric lamp arranged near and exteriorly of the casing, a circuit having the interior and exterior lamps connected in series therewith whereby when the exterior lamp glows the interior lamp is extinguished, and circuit closing means to short circuit the circuit whereby the exterior lamp is extinguished and the interior lamp made to glow.

5. In an egg tester of the character described, a casing having egg receiving openings, a circuit bar connected with the casing, a plurality of contacts connected with the circuit bar, a co-acting circuit bar arranged near the first named circuit bar, movable doors arranged near the egg receiving openings and having electrical connection with the second named circuit bar and adapted to be moved by the eggs into engagement with the contacts, a source of current, and means for connecting the opposite poles of the source of current with the circuit bars.

6. In an egg tester of the character described, a casing having an egg receiving opening, an electric lamp arranged within the casing, a circuit connected with the electric lamp, a bus bar connected with one side of the circuit and carrying a contact element, a co-acting bus bar connected with the other side of the circuit and normally free from electrical connection with the first named bus bar, and a circuit closing door pivoted upon the co-acting bus bar and adapted to be moved by the insertion of an egg within the egg receiving opening for closing the circuit by engaging the contact element.

7. In an egg tester of the character described, a casing having an egg receiving opening, an electric lamp arranged within the casing, a circuit connected with the electric lamp, a bus bar connected with one side of the circuit and carrying a spring contact, a co-acting bus bar connected with the other side of the circuit and normally free from electrical connection with the first named bus bar, a circuit closing door to normally cover the egg receiving opening and having electrical connection with the co-acting bus bar and adapted to be moved to the open position by inserting an egg within the egg receiving opening whereby the circuit closing door engages the spring contact, and spring means to normally hold the circuit closing door in the closed position.

8. In an egg tester of the character described, a casing having a plurality of egg receiving openings, an electric lamp arranged within the casing, a circuit connected with the electric lamp, a bus bar connected with one side of the circuit and carrying a plurality of contact elements, a co-acting bus bar connected with the other side of the circuit and normally free from electrical connection with the first named bus bar, a plurality of swinging circuit closing doors to normally cover the egg receiving openings and having electrical connection with the co-acting bus bar and adapted to engage with the contact elements, and means to normally hold the circuit closing doors out of engagement with the contact elements.

9. In an egg tester of the character described, a casing having a plurality of egg receiving openings, an electric lamp arranged within the casing, a circuit connected with the electric lamp, a bus bar connected with one side of the circuit and carrying a plurality of contact elements, a co-acting bus bar connected with the other side of the circuit and normally free from electrical connection with the first named bus bar, a plurality of swinging contact members having electrical connection with the co-acting bus bar and adapted to engage the contact elements, an electric lamp arranged near and exteriorly of the casing, a stationary contact adapted to be engaged and disengaged by one swinging contact member, and a circuit connected with the exterior lamp with one end thereof connected with the first named bus bar and the opposite end connected with the stationary contact.

10. In an egg tester of the character described, a casing having one side thereof formed open, a door to normally cover the open side of the casing and adapted to be moved to open and closed positions and having an egg receiving opening formed therein, an electric lamp arranged within the casing, a circuit connected with the lamp, and circuit closing means connected in the circuit and secured to the inner side of the door in proximity to the egg receiving opening thereof.

11. In an egg tester of the character described, a casing having an egg receiving opening, an electric lamp arranged within the casing, a second electric lamp connected with and arranged exteriorly of the casing, a source of current, circuits connecting the lamps with the source of current, a movable egg engaging element arranged in proximity to the egg receiving opening, and means operated by the egg engaging element for opening one circuit and closing the other.

12. In an egg tester of the character described, a casing having an egg receiving opening, an electric lamp connected with the casing and arranged exteriorly thereof and normally glowing, a second lamp arranged within the casing and normally extinguished, and means operated by contact with an egg to approximately simultaneously extinguish the normally glowing exterior lamp and cause the normally extinguished interior lamp to glow.

In testimony whereof I affix my signature in presence of two witnesses.

WILLIAM A. BAILEY.

Witnesses:
JAMES A. POTTER,
I. V. McPHERSON.

Copies of this patent may be obtained for five cents each, by addressing the "Commissioner of Patents, Washington, D. C."